(12) United States Patent
Montemurro et al.

(10) Patent No.: US 11,328,728 B2
(45) Date of Patent: May 10, 2022

(54) VOICE ASSISTANT PROXY FOR VOICE ASSISTANT SERVERS

(71) Applicant: BlackBerry Limited, Waterloo (CA)

(72) Inventors: Michael Peter Montemurro, Toronto (CA); James Randolph Winter Lepp, Ottawa (CA)

(73) Assignee: BlackBerry Limited, Waterloo (CA)

( * ) Notice: Subject to any disclaimer, the term of this patent is extended or adjusted under 35 U.S.C. 154(b) by 186 days.

(21) Appl. No.: 16/747,261

(22) Filed: Jan. 20, 2020

(65) Prior Publication Data
US 2021/0225378 A1   Jul. 22, 2021

(51) Int. Cl.
*G10L 15/22* (2006.01)
*G10L 15/26* (2006.01)
*G06F 21/32* (2013.01)

(52) U.S. Cl.
CPC ............ *G10L 15/26* (2013.01); *G06F 21/32* (2013.01); *G10L 15/22* (2013.01); *G10L 2015/223* (2013.01); *G10L 2015/225* (2013.01)

(58) Field of Classification Search
CPC ... G10L 15/22; G10L 15/26; G10L 2015/223; G10L 2015/225; G10L 13/00; G10L 15/30; G10L 15/1822; G10L 15/063; G10L 15/32; G10L 17/00; G10L 15/183; G10L 15/1815; G10L 15/187; G10L 17/24; G10L 15/197; G10L 15/28; G10L 17/22; G10L 2015/227; G10L 15/02; G10L 5/18; G10L 17/08; G10L 2015/0631; G10L 21/16; G10L 25/51; G10L 25/84; G10L 13/027; G06F 3/167; G06F 2203/0381; G06F 40/279; G06F 40/30; G06F 16/738; G06F 40/44; G06F 3/048; G06F 3/0381; G06F 3/04817; G06F 3/0485; G06F 3/165; G06F 40/58
USPC .... 704/270.1, 275, 270, 246, 257, 260, 235, 704/9; 381/88.01, 88.16, 8, 88.03, 88.13, 381/88.23; 707/999.003
See application file for complete search history.

(56) References Cited

U.S. PATENT DOCUMENTS

| | | | | |
|---|---|---|---|---|
| 10,057,125 | B1 * | 8/2018 | Roman | H04W 8/005 |
| 10,102,359 | B2 * | 10/2018 | Cheyer | H04L 63/10 |
| 10,417,037 | B2 * | 9/2019 | Gruber | G06Q 10/10 |
| 10,475,446 | B2 * | 11/2019 | Gruber | G10L 15/183 |
| 10,515,632 | B2 * | 12/2019 | Gilbert | G06F 3/167 |
| 10,573,312 | B1 * | 2/2020 | Thomson | G10L 15/187 |
| 10,748,529 | B1 * | 8/2020 | Milden | G10L 15/22 |
| 10,789,041 | B2 * | 9/2020 | Kim | G10L 15/20 |
| 10,964,325 | B2 * | 3/2021 | Gilbert | G10L 15/22 |

(Continued)

OTHER PUBLICATIONS

Extended European Search Report; EP Application No. 21151606.7 dated Jun. 7, 2021.

*Primary Examiner* — Vijay B Chawan
(74) *Attorney, Agent, or Firm* — Ridout and Maybee LLP

(57) ABSTRACT

A voice assistant proxy for voice assistant servers and related methods. The voice assistant proxy comprises a processor configured to convert voice data to text using speech-to-text synthesis, determine a voice command from the text, determine whether the voice command is associated with sensitive data based on a set of criteria, route the voice command to an enterprise voice assistant server in response to a determination that the voice command is sensitive, route the voice command to a third party voice assistant server in response to a determination that the voice command is not sensitive.

20 Claims, 4 Drawing Sheets

(56) References Cited

U.S. PATENT DOCUMENTS

| | | | | |
|---|---|---|---|---|
| 11,017,778 | B1* | 5/2021 | Thomson | G10L 15/22 |
| 2004/0225650 | A1* | 11/2004 | Cooper | H04M 3/527 |
| 2009/0018839 | A1* | 1/2009 | Cooper | G10L 15/26 |
| | | | | 704/260 |
| 2014/0040748 | A1* | 2/2014 | Lemay | G06Q 10/107 |
| | | | | 715/728 |
| 2018/0137856 | A1* | 5/2018 | Gilbert | G10L 15/22 |
| 2018/0232817 | A1* | 8/2018 | Isaacson | G06F 16/951 |
| 2019/0036923 | A1* | 1/2019 | Xuan | H04L 67/141 |
| 2020/0082825 | A1* | 3/2020 | Gilbert | G06F 3/167 |
| 2020/0243094 | A1* | 7/2020 | Thomson | G10L 15/22 |

* cited by examiner

VOICE ASSISTANT PROXY FOR VOICE ASSISTANT SERVERS

TECHNICAL FIELD

The present disclosure relates to secure communications, particularly to a system, device and method for handling sensitive data during a communication session with a voice assistant, and more particularly a voice assistant proxy for voice assistant servers.

BACKGROUND

Voice assistants are software applications that use speech recognition to receive, interpret and execute voice commands. Voice assistants may be provided by a mobile wireless communication device such as a smartphone, tablet, laptop computer, smart speaker or similar smart or internet-of-things (IoT) device. Because of the varying environments in which voice assistants may be used, the privacy of communications can be a concern. Thus, there is a need for a method for handling sensitive data during a communication session with a voice assistant.

DESCRIPTION OF EMBODIMENT EMBODIMENTS

Figure 1:
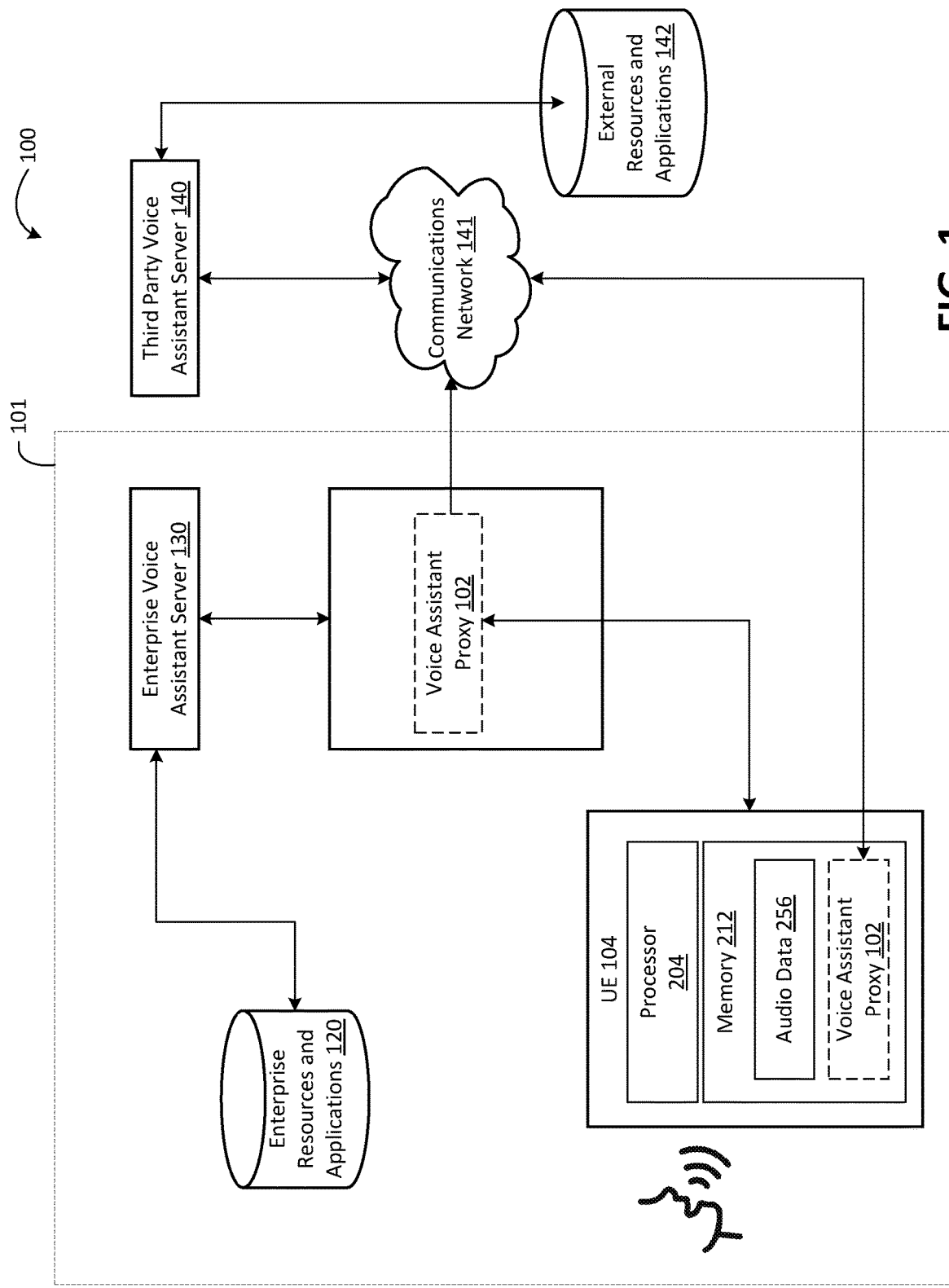
FIG. 1 is a schematic diagram of a communication system in accordance with an embodiment of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except wherein indicated otherwise either explicitly or inherently by context.

The present disclosure provides a system, device and method for handling sensitive data during a communication session with a voice assistant. In one aspect, the present disclosure provides a voice assistant proxy for voice assistant servers. The voice assistant proxy determines from the content of voice data and optionally a context of the user or host device at a time at which the voice data was acquired whether the voice data is associated with sensitive data, determines an appropriate voice assistant server to process the voice data based on whether the voice data is associated with sensitive data, and routes the voice data to the determined voice assistant server endpoint for further processing.

In accordance with one aspect of the present disclosure, there is provided a method, comprising: converting voice data to text using speech-to-text synthesis; determining a voice command from the text; determining whether the voice command is associated with sensitive data based on a set of criteria; routing the voice command to an enterprise voice assistant server in response to a determination that the voice command is sensitive; and routing the voice command to a third party voice assistant server in response to a determination that the voice command is not sensitive.

In some embodiments, determining a voice command from the text comprises determining a keyword and parameters associated with the keyword upon which the keyword operates, and determining whether the voice command is associated with sensitive data based on a set of criteria comprises determining whether the keyword and parameters associated with the keyword upon which the keyword operates are is associated with sensitive data based on the set of criteria.

In some embodiments, the method further comprises: determining whether a user associated with the voice data is authorized to perform the voice command; rejecting the voice command in response to a determination that the user is not authorized to perform the voice command; wherein routing the voice command to an enterprise voice assistant server in response to a determination that the voice command is sensitive and routing the voice command to a third party voice assistant server in response to a determination that the voice command is not sensitive are only performing in response to a determination that the user is authorized to perform the voice command.

In some embodiments, the user associated is determined to be unauthorized to perform the voice command in response to a determination that one of the following conditions is met: the user is not authorized to perform the voice command; or the user is not authorized to access enterprise data required by the voice command.

In some embodiments, the method further comprises: generating a notification that the voice command was rejected in response to a determination that the user is not authorized to perform the voice command.

In some embodiments, the notification indicates a message that the voice command was rejected in response to a determination that the user is not authorized to perform the voice command.

In some embodiments, routing the voice command comprises: sending the voice data to the determined voice assistant server.

In some embodiments, routing the voice command comprises: sending a transcript comprising the converted text and/or the determined keyword and parameters to the determined voice assistant server.

In some embodiments, routing the voice command comprises: sending the context information representative of a context of a user equipment upon which the voice data was received at a time that the voice data was received to the determined voice assistant server along with any combination of the voice data, a transcript comprising the converted text and/or the determined keyword and parameters.

In some embodiments, the set of criteria comprises a set of security rules.

In some embodiments, the set of security rules are based on a set of IT policies.

In some embodiments, the set of security rules determine whether and how to route the voice command based on any combination of a user associated with the voice data, the voice command, requested data or other resources, and a location of user equipment providing a voice user interface (VUI) endpoint.

In some embodiments, the voice command is determined to be associated with sensitive data in response to a determination that one of the following conditions is met: the voice command is an enterprise voice command; or the voice command requires access to enterprise data.

In some embodiments, the voice command is determined to be associated with sensitive data in response to a determination that one of the following conditions is met: the voice command is an enterprise voice command; the voice command requires access to enterprise data; or the location of user equipment providing the VUI endpoint is an enterprise location.

In accordance with another aspect of the present disclosure, there is a provided a computing device a processor and a memory coupled to the processor, the memory having tangibly stored thereon executable instructions for execution by the processor, wherein the executable instructions, in response to execution by the processor, cause the computing device to perform the methods described herein.

In accordance with a further aspect of the present disclosure, there is provided a non-transitory machine readable medium having tangibly stored thereon executable instructions for execution by a processor of a computing device, wherein the executable instructions, in response to execution by the processor, cause the computing device to perform the methods described herein.

FIG. 1 illustrates a communication system ("system") 100 in accordance with an embodiment of the present disclosure. The system 100 is operated by an enterprise such as corporation or other organization. The system 100 comprises a plurality of user equipment ("UE") 104 (only one of which is shown) configured to communicate with a first voice assistant server denoted the third party voice assistant server 140 external to an enterprise network 101 and operated by a third part, and a second voice assistant server denoted the enterprise voice assistant server 130 located within the enterprise network 101 and operated by the enterprise.

The enterprise voice assistant server 130 and the third party voice assistant server 140 provide cloud-based voice assistant services to voice assistant application software on the UE 104 in a client-server relationship. The enterprise voice assistant server 130 provides an enterprise voice assistant for handling sensitive data and information of the enterprise whereas the third party voice assistant server 140 provides a third party voice assistant for handling non-confidential and non-sensitive data and information. The system 100 also comprises a voice assistant proxy 102 for the enterprise voice assistant which determines from the content of voice data and optionally a context of a user and/or the UE 104 at a time at which the voice data was acquired whether the voice data is associated with sensitive data, sensitive data, determines an appropriate voice assistant server to process the voice data based on whether the voice data is associated with sensitive data, and routes the voice data to the determined voice assistant server endpoint for further processing as described more fully below.

The system 100 comprises at least one instance of the voice assistant proxy 102 implemented by one or more software applications running on a computing system that comprises one or more computing devices, such as a server which may be implemented as a number of server modules. The voice assistant proxy 102 may be implemented on the UE 104 or on a server in the enterprise network 101, such as the enterprise voice assistant server 130. The voice assistant proxy 102 may communicate with other devices in the system 100 via respective application programming interfaces (APIs) which may, for example, be web APIs.

The enterprise voice assistant server 130 may have access to enterprise resources (e.g., enterprise data such as documents, address books, contact lists, etc.) and applications 120. The enterprise data may comprise sensitive data and information. The enterprise data may be digitally marked as being sensitive. For example, the enterprise data may be encoded with metadata, or the like as being confidential, sensitive, restricted or the like. Alternatively, the enterprise data may be determined to be sensitive based on a logical location of such data within the enterprise network 101 or access control information of an access control system (ACS) of the enterprise network 101. Alternatively, all enterprise data may be deemed sensitive.

The third party voice assistant server 140 may have access to external resources and applications 142. The external resources may comprise external data and services. The external resources and applications 142 may have a greater number of features and functions than the enterprise resources and applications 120. Similarly, the third party voice assistant server 140 may be configured to recognize a greater number of skills (i.e., commands) and performed a greater number of actions than the enterprise voice assistant server 130. By way of embodiment, the third party voice assistant server 140 may support Alexa™ from Amazon.com, Inc., Google Assistant™ from Google LLC or Siri™ from Apple Inc.

The voice assistant proxy 102 is configured to interface with at least one voice assistant application 270 (FIG. 2) on the UE 104 which provides a voice assistant interface (VUI). The voice assistant application 270 may provided a VUI for the enterprise voice assistant server 130 and one or more third party voice assistant servers 140, or a dedicated voice assistant application 270 may be provided for each voice assistant server with which the UE 104 is configured to interface. The VUI may be a commercially available VUI such as Alexa™ from Amazon.com, Inc., Google Assistant™ from Google LLC or Siri™ from Apple Inc. The voice assistant proxy 102 may be an add-on or extension to the voice assistant application 270 which integrates with the voice assistant application 270 and its functionality. Alternatively, the voice assistant proxy 102 may be a subroutine of the voice assistant application 270.

The voice assistant proxy 102 is configured with enterprise IT policies stored in memory that specify how to process voice commands, including specify which users are allow to perform voice commands and how permitted/ allowed voice commands are routed. User restrictions on voice commands set by IT policy may be set at the individual or group level. In some embodiments, a voice command may be routed to the enterprise voice assistant server 130, routed to the third party voice assistant server 140, or rejected/dropped. The IT policies may define a set of security rules that determine whether and how to route the voice command based on any combination of the user, the voice command, requested data or other resources, and a location of the UE 104 providing the VUI endpoint. If the user is attempting to access an enterprise voice command for which the user is not authorized and/or enterprise data for which the user is not authorized to access, the voice command is rejected. If the user is attempting to access an enterprise voice command and/or enterprise data for which the user is authorized to access, the voice command is routed to the enterprise voice assistant server 130. If properties of the UE 104 with which the communication session is being conducted (e.g., the location of user equipment providing a VUI endpoint) do not match the IT policies authorized for the voice command or requested data or other resources, the voice command may be dropped.

The UE 104 is a host computing device for a voice assistant application and is an electronic device that may be a wireless communication device such as a smartphone, tablet, laptop computer, smart speaker or similar smart or IoT device, an embodiment of which is described below. In some applications, the voice user interface on the UE 104 may be the same and independent of whether the enterprise voice assistant server 130 or third party voice assistant server 140 provides backend support.

The system 100 is provided for the purpose of illustration only. The system 100 comprises one possible communication network configuration of a multitude of possible configurations. Suitable variations of the communication system 100 will be understood to a person of skill in the art and are intended to fall within the scope of the present disclosure. In some embodiments, the system 100 includes multiple components distributed among a plurality of computing devices. One or more components may be in the form of machine-executable instructions embodied in a machine-readable medium.

Figure 2:
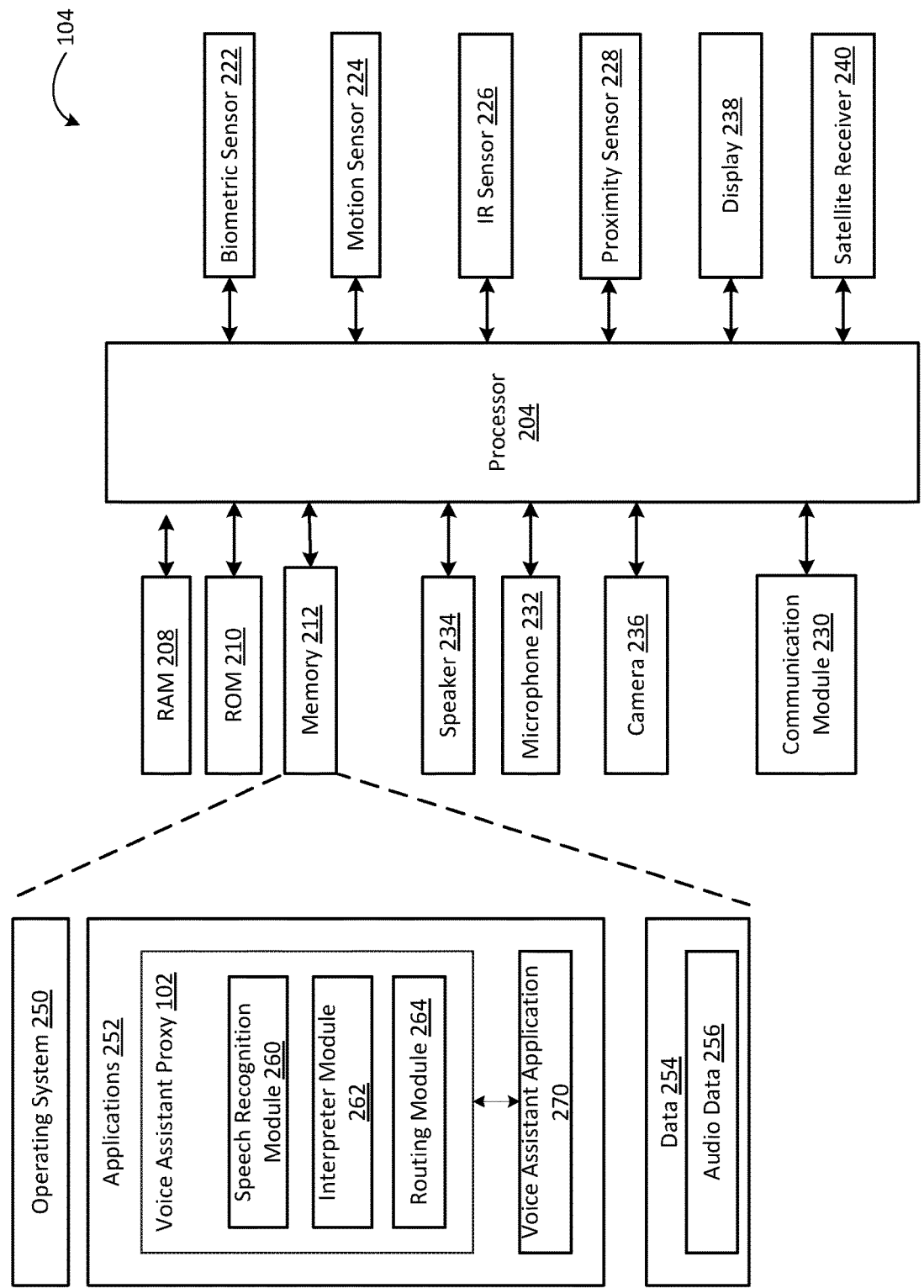
FIG. 2 is a block diagram of user equipment for use as a voice assistant device in accordance with an embodiment of the present disclosure.

Referring to FIG. 2, a UE 104 in accordance with an embodiment of the present disclosure will be described. The UE 104 includes a controller comprising at least one processor 204 (such as a microprocessor) which controls the overall operation of the UE 104. The processor 204 is coupled to a plurality of components via a communication bus (not shown) which provides a communication path between the components and the processor 204. The processor 204 is coupled to Random Access Memory (RAM) 208, Read Only Memory (ROM) 210, and persistent (non-volatile) memory 212 such as flash memory and a communication module 230. The communication module 230 includes one or more wireless transceivers for exchanging radio frequency signals with wireless networks. The communication module 230 may also include a wireline transceiver for wireline communications with wired networks. The wireless transceivers may include one or a combination of Bluetooth transceiver or other short-range wireless transceiver, a Wi-Fi or other wireless local area network (WLAN) transceiver for communicating with a WLAN via a WLAN access point (AP), or a wireless wide area network (WWAN) transceiver such as a cellular transceiver for communicating with a radio access network (e.g., cellular network). The cellular transceiver may communicate with any one of a plurality of fixed transceiver base stations of the cellular network within its geographic coverage area. The wireless transceivers may include a multi-band cellular transceiver that supports multiple radio frequency bands. Other types of short-range wireless communication include near field communication (NFC), IEEE 802.15.3a (also referred to as UltraWideband (UWB)), Z-Wave, ZigBee, ANT/ANT+ or infrared (e.g., Infrared Data Association (IrDA) communi-cation). The wireless transceivers may include a satellite receiver for receiving satellite signals from a satellite network that includes a plurality of satellites which are part of a global or regional satellite navigation system.

The UE 104 also comprises a microphone 232 and a speaker 234 coupled to the processor 204. The UE 104 may also comprise a camera 236, display 238, such as a touchscreen, and a satellite receiver 240 for receiving satellite signals from a satellite network, depending on the type of the UE 104. The UE 104 may also comprise a plurality of sensors 220 coupled to the processor 204. The sensors 220 may comprise a biometric sensor 222 such as face scanner or finger print scanner, a motion sensor 224, an infrared (IR) sensor 226, and/or a proximity sensor 228. The sensors 220 may include other sensors (not shown) such as an orientation sensor, electronic compass or altimeter, among possible embodiments. The UE 104 may also comprise one or more input devices such as buttons, switches, dials, a keyboard or keypad, or navigation tool, depending on the type of the UE 104.

In some embodiments, the UE 104 may be an audio device having a microphone 232 for receiving audio data as input (e.g., voice commands from a user) and a speaker 234 for outputting audio but which does not comprise a display or similar visual interface. The audio device may also comprise one or more auxiliary output devices (not shown) such as a vibrator or LED to provide notifications or the like (e.g., an LED may be used to indicate that the device is powered on). The audio device may be a soundbar, a smart speaker or other smart or IoT device, which may be embedded in an object such as a lamp, furniture or other household or personal object. In other embodiments, the UE 104 may be a multi-purpose communication device such as a wired or wireless communication device such as a smartphone, tablet, or personal computer.

Operating system software 250 executable by the processor 204 is stored in the persistent memory 212 but may be stored in other types of memory devices, such as ROM 208 or similar storage element. A number of applications 252 executable by the processor 204 are also stored in the persistent memory 212. The applications 252 comprises the voice assistant application 270. The voice assistant application comprises instructions for implementing the voice assistant interface (e.g., VUI), to enable a user to interact with and provide instructions to the UE 104 via audible input (e.g., voice input) in the form of audio data (comprising voice data). The voice assistant interface allows received audio data to be converted/translated into keyboards, commands or intents, for embodiment.

The voice assistant application 270 can operate while other applications 252 are in operation, running in the background. The voice assistant application 270 may be able to collect data from other running applications 252 regarding user interactions and use this data to carry out the methods described herein. The voice assistant application 270 detecting sounds generated by a user and may be configured to begin recording audio data 256 in response to determined that the user has spoken a wake word to begin a communication session. A wake word is one or more pre-configured words that begin a communication session. For example, the word "Blackberry" may be a wake word. The UE 104 is configured to send audio data 262 to a voice assistant server 130 or 140 as described below. The term "communication session" refers to a discrete interaction with the voice assistant application 270 between sleep states. Each communication session may end in response to detection of a sleep word, after a pre-determined period of inactivity in which no voice data is detected, detection of other user input on the UE 104 (for example, activating of a mute or off button), or powering down/off of the UE 104. A sleep word is one or more pre-configured words that end a communication session, such as "Sleep Blackberry".

The memory 212 stores a variety of data 254, including sensor data acquired by the sensors, audio data 256 acquired by the microphone 232, user data including user preferences, settings and possibly biometric data about the user for authentication and/or identification, a download cache including data downloaded via the wireless transceivers, and saved files. System software, software modules, specific device applications, or parts thereof, may be temporarily loaded into RAM 208. Communication signals received by the UE 104 may also be stored in RAM 208. Although specific functions are described for various types of memory, this is merely one embodiment, and a different assignment of functions to types of memory may be used in other embodiments.

The voice assistant proxy 102 comprises a speech recognition module 260, an interpreter module 262, and a routing module 264. The voice assistant proxy 102, when resident on the UE 104, may be part of the voice assistant application 270, or may share resources with the voice assistant application 270 including possibly application code. For example, the speech recognition module 260 of the voice assistant proxy 102 may be part of the voice assistant application 270. The speech recognition module 260 converts audio data comprising voice data (also known as voice input) received by the microphone 232 to text using speech-to-text synthesis, and determines from the text a keyword and one or more parameters associated with the keyword upon which the keyword operates. A voice input is a discrete voice sample. The speech recognition module 260 is configured to detect voice inputs, for example, by a brief or momentary pause or delay between voice samples. The number and type of parameter is depending on the keyword. The keyword and parameters may be determined directly from the converted text (also known as derived text) or determined by matching the converted text to a plurality of words, synonyms and semantic meaning using natural language processing (NLP). The speech recognition module 260 may comprise an NLP module that may comprise one or more trained machine-learning algorithms. The keywords may also be referred to as "skills" or "commands" and the parameters may be also be referred to as intents. The parameters (intents) function as data upon which the keyword (skill) operates. For example, the voice input "BlackBerry, what is the weather today?" may be translated to the wake word "Blackberry", the keyword "weather" and the parameter "today". The speech recognition module 260 outputs the keyword and parameters associated with the keyword to the interpreter module 262.

The speech recognition module 260 also detects the one or more wake words, such as "BlackBerry". The speech recognition module 260 may have a wake word listener which listener which, when the UE 104 is in a sleep mode (also known as a low power mode), converts audio data comprising voice data received by the microphone 232 to text using speech-to-text synthesis and determines from the text whether the one or more wake words are present in the voice input, and if present, the UE 104 changes from the sleep mode to a wake mode (also known as a full power mode). The speech recognition module 260 only analyses the text to determine from the text a keyword and one or more parameters associated with the keyword upon which the keyword operates when the UE 104 is in the wake mode.

After transitioning from the sleep mode to the wake mode, the speech recognition module 260 may analyze the voice input which the one or more wake words were present to determined determine from the text a keyword and one or more parameters associated with the keyword upon which the keyword operates.

The interpreter module 262 receives the keyword and parameters from the speech recognition module 260 and determines how to handle the voice command based on whether the voice command is associated with sensitive data. This determination may be made based on the content of the voice command as described below. A voice command may be routed to the enterprise voice assistant server 130 or routed to the third party voice assistant server 140 in some embodiments. A voice command may be routed to the enterprise voice assistant server 130, routed to the third party voice assistant server 140, or rejected/dropped in other embodiments.

The interpreter module 262 determines whether the voice command is associated with sensitive data based on a set of criteria. In some embodiments, the criteria is based at least in part on the content of the voice command and determining whether the voice command is associated with sensitive data based on a set of criteria comprises determining whether the keyword and parameters associated with the keyword upon which the keyword operates are is associated with sensitive data based on the set of criteria. The set of criteria may comprise data or applications requested by the voice command, context information representative of the context of the user and/or UE 104 at the time the voice data was received, or a combination thereof. The context information may comprise a location of the user and/or UE 104 at the time when the voice command was received, sensor data acquired by the sensors 220, or image data acquired by the camera 236. The location may be defined by location information, which may be based on a geolocation. The geolocation may be determined by the satellite receiver 240. The set of criteria may comprise, or be defined by, a set of security rules. The security rules may be based on IT policies stored by the voice assistant proxy 102 or trained machine-learning algorithms. The set of security rules may determine whether and how to route the voice command based on any combination of the user, the voice command, requested data or other resources, and a location of the UE 104 providing the VUI endpoint.

In some embodiments, the interpreter module 262 or routing module 264 may determine whether a user associated with the voice data is authorized to perform the voice command. This step is optional and may be omitted in other embodiments. The determination of whether a user associated with the voice data is authorized to perform the voice command may be based on the identity of the user and the IT policy for the voice command and/or data associated with the voice command. The voice command is rejected in response to a determination that the user is not authorized to perform the voice command. The voice command is accepted or allowed in response to a determination that the user is authorized to perform the voice command. The user may be identified at the start of the communication session or during the communication session (for example, in response to a voice command having an enterprise IT policy that restricts access to that voice command) using a suitable technique.

The interpreter module 262 may receive the context information representative of the context of the user and/or UE 104 at the time the voice command was received, and determine whether a user associated with the voice command is authorized to perform the voice command and/or determine whether the voice command is associated with sensitive data based on the keyword and parameters, the context information and the set of criteria (e.g., set of security rules). The interpreter module 262 outputs the determination as to whether the voice data is associated with sensitive data to the routing module 264.

The context information may, in some embodiments, be used to perform an assessment of whether an environment in which the user and/or UE 104 is located is "secure" or "insecure", or "enterprise" or "non-enterprise", for example, based on the geolocation of the UE 104. In such embodiments, the interpreter module 262 is determine that the voice data is associated with sensitive data in response to a determination the geolocation of the UE 104 is "secure" or "enterprise", or in response to a determination that a wired or wireless network to which the UE 104 is connected is "secure" or "enterprise". Thus, context information indicating that the user and/or UE 104 is in a location that is "secure" or "enterprise" at the time the voice command was received may be used to determine that the voice command is associated with sensitive data (i.e., the user or UE 104 is located at the enterprise, or at another secure location such as a home office) and thereby route the voice command to the enterprise voice assistant server 130.

The UE 104 may use Global Navigation Satellite System (GNSS) data such as GPS data, or triangulation via cellular or WLAN access, to determine the geolocation of the UE 104 if unknown, and determine whether the geolocation is "secure" or "insecure", or "enterprise" or "non-enterprise". The determination of whether the determined geolocation is "secure" or "insecure", or "enterprise" or "non-enterprise", may comprise comparing the determined geolocation to a list of geolocations designated as "secure" or "enterprise", and determining whether the determined geolocation matches a "secure" or "enterprise" geolocation. A determined geolocation may be determined to match a "secure" or "enterprise" geolocation in response to a determination that it falls within a geofence defined for the "secure" or "enterprise" geolocation. A geofence is a virtual perimeter defined by a particular geographic area using geo-spatial coordinates, such as latitude and longitude. The "secure" or "enterprise" geolocations may be a room or number of rooms of a house, commercial or corporate building, hotel, apartment of condo building, an entire house, a hotel, or apartment of condo building, a vehicle, or other comparable location. The determined geolocations and "secure" or "enterprise" geolocations may be defined in terms of a geographic coordinate system that depends on the method of determining the geolocation. A common choice of coordinates is latitude, longitude and optionally elevation. For example, in response to GNSS being used to determine the geolocation, the geolocation may be defined in terms of latitude and longitude, the values of which may be specified in one of a number of different formats including degrees minutes seconds (DMS), degrees decimal minutes (DDM), or decimal degrees (DD).

Whether a particular geolocation is "secure" or "enterprise" may be pre-set by a user, an enterprise voice assistant server 130 (or operator thereof) or other means. Alternatively, whether a particular geolocation is "secure" or "enterprise" may be determined dynamically in real-time, for example, by the UE 104 or by prompting a user. In response to a determination that the "secure" or "enterprise" geolocation is a mobile location such as a vehicle, the geofence that defines the "secure" or "enterprise" geolocation is determined dynamically. Additional factors may be used to identify or locate a mobile location, such as a smart tag (e.g., NFC tag or similar short-range wireless communication tag), wireless data activity, etc.

In some embodiments, the enterprise voice assistant server 130 and third party voice assistant server 140 may be associated with different wake words so that, when the wake word associated with the respective voice assistant server is detected, the entire communication session is conducted with that voice assistant server. For example, if the enterprise voice assistant server 130 is configured to use the wake word "Blackberry", detection of the wake word "Blackberry", indicates that the enterprise voice assistant server 130 should be used for the entire communication session whereas if the wake word for the third party voice assistant server 140 is detected, this indicates that the third party voice assistant server 140 should be used for the entire communication session.

The routing module 264 determines the appropriate voice assistant server endpoint for further processing based on whether the voice data is associated with sensitive data, and routes the voice data to the determined voice assistant server endpoint. In some embodiments, this only occurs when the voice command is not rejected because the user is not authorized to perform the voice command. In response to a determination that the voice data is associated with sensitive data, the voice data is routed by the routing module 264 to the enterprise voice assistant server 130. In response to a determination that the voice data does not relate to sensitive data, the voice data is routed by the routing module 264 to the third party voice assistant server 140. A transcript comprising the converted text generated by the speech recognition module 260 and/or the corresponding keyword and parameters determined by the speech recognition module 260 may be routed to the determined voice assistant server endpoint instead of, or in addition to, the raw voice data. Context information such as a geolocation of the UE 104 and/or geolocation type (e.g., secure or insecure; enterprise or non-enterprise) may also be routed to the determined voice assistant server in addition to the voice data, transcript and/or corresponding keyword and parameters.

Figure 3:
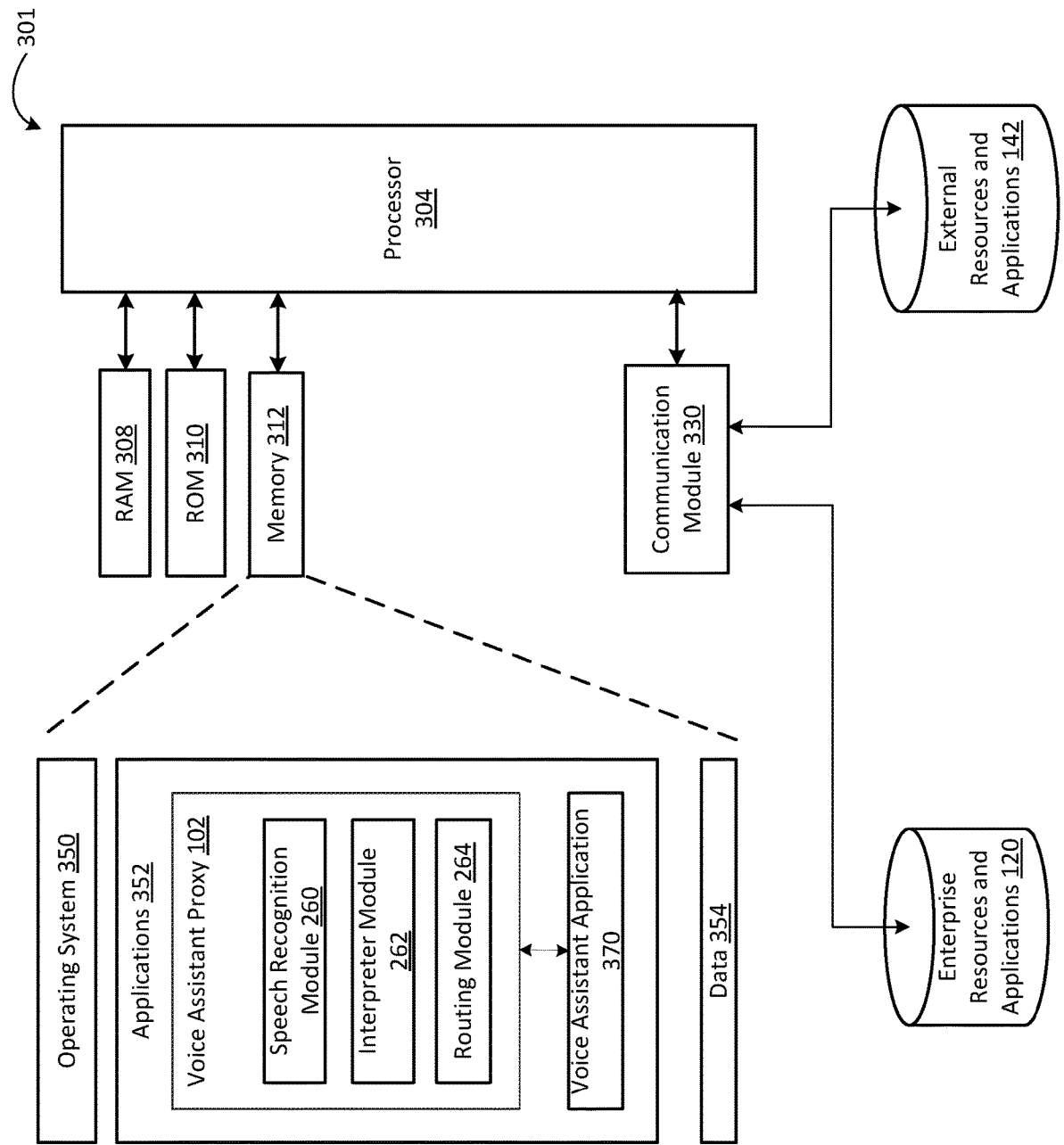
FIG. 3 is a block diagram of a voice assistant server in accordance with an embodiment of the present disclosure.

Referring to FIG. 3, a voice assistant server 301, which may be an enterprise voice assistant server 130 or third party voice assistant server 140, in accordance with an embodiment of the present disclosure will be described. The voice assistant server 301 includes a controller comprising at least one processor 304 which controls the overall operation of the UE 104. The processor 304 is coupled to a plurality of components via a communication bus (not shown) which provides a communication path between the components and the processor 304. The processor 304 is coupled to RAM 308, ROM 310, and persistent (non-volatile) memory 312 such as flash memory and a communication module 330.

Operating system software 350 executable by the processor 304 is stored in the persistent memory 312 but may be stored in other types of memory devices, such as ROM 308 or similar storage element. A number of applications 352 executable by the processor 304 are also stored in the persistent memory 312 as well as a variety of data 354. The applications 352 comprise a voice assistant application 370 and may comprise the voice assistant proxy 102, depending on the embodiment. The voice assistant application 370 is a server-side counterpart to the voice assistant application 270 on the UEs 104. The voice assistant proxy 102, when resident on the voice assistant server 301, may be part of the voice assistant application 370, or may share resources with the voice assistant application 370 including possibly application code. For example, the speech recognition module 260 of the voice assistant proxy 102 may be part of the voice assistant application 370.

The voice assistant application 370 interacts with the voice assistant application 270 on the UEs 104 including receiving voice data acquired by the microphone 232 and optionally one or any combination of a transcript comprising the converted text generated by the speech recognition module 260 of the UEs 104, the corresponding keyword and parameters determined by the speech recognition module 260 of the UEs 104, or context information. The voice assistant application 370 may re-process the voice data and convert the received voice data using its own speech recognition module rather than relying on the transcript comprising the converted text generated by the speech recognition module 260 of the UEs 104 and/or the corresponding keyword and parameters determined by the speech recognition module 260 of the UEs 104, depending on the embodiment. The speech recognition module of the voice assistant server 301 may be more advanced than the speech recognition module 260 of the UEs 104 and may therefore generate a more accurate transcript and/or the corresponding keyword and parameters in some embodiments. The speech recognition module of the voice assistant server 301 may be configured to recognize different and/or a greater number of keywords, commands or skills than the speech recognition module 260 of the UEs 104 in some embodiments. The voice assistant application 370 processes keywords and parameters generated from the voice data or received from the UEs 104 and generate instructions and data for the UEs 104 based on the processed keywords and parameters. The voice assistant application 370 may interact with enterprise resources and applications 120 or external resources and applications 142 depending on a type of the voice assistant server 301.

Figure 4:
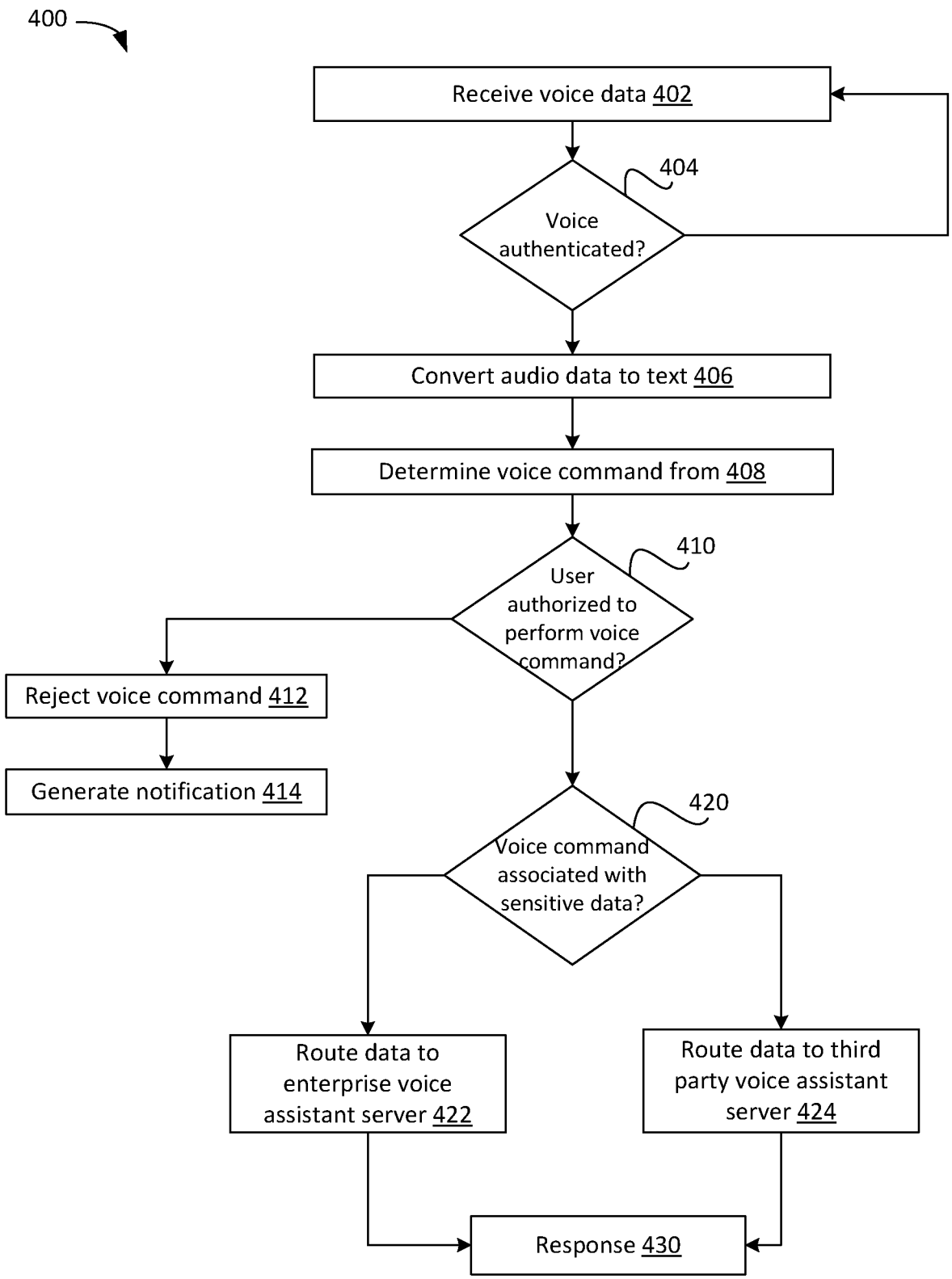
FIG. 4 is a flowchart of a method of handling sensitive data during a communication session with a voice assistant in accordance with an embodiment of the present disclosure.

FIG. 4 is a flowchart of a method 400 of handling sensitive data during a communication session with a voice assistant in accordance with an embodiment of the present disclosure. The method 400 may be carried out by software executed, for example, by a processor of a voice assistant proxy 102 illustrated in FIG. 1. The method 400 is performed while the VUI provided by the voice assistant application 270 is active, i.e. during a communication session. The communication session is associated with a user, and each user is associated with a user identifier (ID) such as a username. The user associated with the communication session may be pre-determined, for example, during an initial registration or setup process when the host UE 104 is first used or when control of the host UE 104 is transferred to the user. Alternatively, the user may be identified as part of initiating the communication session or at the start of the communication session, for example, via voice recognition performed on a voice sample or the provision of other user credentials such as a name and shared secret (e.g., password, passcode, personal identification number (PIN), answer to a security question, etc.).

As noted above, when not in a communication session, the VUI may run in the background waiting for a wake word to initiate the communication session. User authentication may be performed as part of, or subsequent to, initiating the communication session. Alternatively, authentication may not be performed, for example, because user authentication was performed within a threshold duration of the initiating the communication session. For example, some authentication protocols authenticate communications for a threshold duration, for example, for a number of hours or an entire day.

Techniques for initiating a communication session and authentication are known in the art and will not be described in detail herein.

At action 402, the UE 104 receives audio data comprising voice data from the microphone 232. The UE 104, during a communication session, continually analyses audio data acquired by the microphone 232 to determine whether it contains voice data, and if so, processes the voice data as described below.

At action 404, the UE 104 optionally attempts to authenticate the user (or voice) by performing voice recognition (e.g., speaker identification if the user has not been identified during the communication session or speaker verification if the user has already been identified during the communication session) on the voice data. In response to the user being authenticated, operations proceed to action 406 described below. In response to the user not being authenticated, the voice data is ignored. In some embodiments, the communication session also ended in response to the user being authenticated.

Voice recognition identifies a user associated with the voice data by analyzing the features of speech that differ between individuals. Every person has a unique pattern of speech that results from anatomy (e.g., size and shape of the mouth and throat, etc.) and behavioral patterns (voice's pitch, speaking style such as intonation, accent, dialect/vocabulary, etc.). Speaker verification is a form of voice recognition in which a person's voice is used to verify the identity of the person. With a suitable sample of a user's speech, a person's speech patterns can be tested against the sample to determine if the voice matches, and if so, the person's identify is verified. Speaker identification is a form of voice recognition in which an unknown speaker's identity is determined by comparing a sample against a database of samples until a match is found. Operation 404 may be omitted in some embodiments, for example, if the user has previously been authenticated and periodic re-authentication is not required. For example, authentication may be performed once per communication session, as part of initiating the communication session or at the start of the communication session. Alternatively, re-authentication may be performed for each voice input or periodically. Alternatively, authentication may be omitted entirely, for example, if the UE 104 is determined to be in a "secure" location or "enterprise" location based on its geolocation. This determination involves first determining the geolocation via the satellite receiver 240 or other means and determining whether the geolocation is "secure" or "enterprise", as described above.

At action 406, the UE 104 via a speech recognition module 260 analyses the content of the audio data and performs speech-to-text synthesis to convert voice data in the audio data to text.

At action 408, the speech recognition module determines a voice command from the text. In some embodiments, determining a voice command from the text comprises determining from the text a keyword and one or more parameters associated with the keyword upon which the keyword operates. In some embodiments, the speech recognition module 260 outputs a keyword and one or more parameters and optionally a transcript of the text.

At action 410, the voice assistant proxy 102 determines whether the user associated with the voice data is authorized to perform the voice command by comparing the user ID and the determined voice command to the IT policies of the voice assistant proxy 102. This action is optional may be omitted in other embodiments. In some embodiments, the user is determined to be unauthorized to perform the voice command in response to a determination that one of the following conditions is met: the user is not authorized to perform the voice command; or the user is not authorized to access enterprise data required by the voice command.

At action 412, the voice assistant proxy 102 rejects the voice command in response to a determination that the user is not authorized to perform the voice command. At action 414, the voice assistant proxy 102 generates a notification that the voice command was rejected in response to a determination that the user is not authorized to perform the voice command. The notification indicates a message that the voice command was rejected in response to a determination that the user is not authorized to perform the voice command. The notification is typically an audible notification generated via the speaker 232 but could be a visual notification displayed on the display 238.

At action 420, the voice assistant proxy 102 determines whether the voice command is associated with sensitive data based on a set of criteria. In some embodiments, determining whether the voice command is associated with sensitive data based on a set of criteria comprises determining whether the keyword and parameters associated with the keyword upon which the keyword operates are is associated with sensitive data based on the set of criteria.

In some embodiments, the set of criteria comprises, or are defined by, a set of security rules. In some embodiments, the set of security rules are based on the IT policies of the voice assistant proxy 102. In other embodiments, the set of security rules comprise trained machine-learning algorithms. In some embodiments, the set of security rules determine whether and how to route the voice command based on any combination of a user associated with the voice data, the voice command, requested data or other resources, and a location of user equipment providing a VUI endpoint.

In some embodiments, the voice command is determined to be associated with sensitive data in response to a determination that one of the following conditions is met: the voice command is an enterprise voice command; or the voice command requires access to enterprise data.

In some embodiments, the voice command is determined to be associated with sensitive data in response to a determination that one of the following conditions is met: the voice command is an enterprise voice command; the voice command requires access to enterprise data; or the location of user equipment providing the VUI endpoint is an enterprise location.

At action 422, the routing module 264 routes the voice command to the enterprise voice assistant server 130 in response to a determination that the voice command is sensitive.

At action 424, the routing module 264 routes the voice command to the third party voice assistant server 140 in response to a determination that the voice command is not sensitive.

Routing the voice command may comprise (i) sending the voice data to the determined voice assistant server 130 or 140, sending (ii) sending a transcript comprising the converted text and/or the determined keyword and parameters and optionally the voice data to the determined voice assistant server 130 or 140, and (iii) context information representative of a context of a user equipment upon which the voice data was received at a time that the voice data was received to the determined voice assistant server 130 or 140 along with any combination of the voice data, a transcript comprising the converted text and/or the determined keyword and parameters. Instructions for the determined voice assistant server 130 or 140 may also be routed.

At action 430, the determined assistant server 130 or 140 processes the voice command, generates a response, and sends the response to the UE 104. The response send to the UE 104 comprises instructions which are processed by the UE 104 upon receipt. The instructions in the response may cause the UE 104 to generate an audible output such as a response to the voice command among other possible responses.

General

The steps and/or operations in the flowcharts and drawings described herein are for purposes of embodiment only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are embodiments only, and are thus not limiting as to the types of memory usable for storage of a computer program.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several embodiment embodiments are described herein, modifications, adaptations, and other implementations are possible. For example, substitutions, additions, or modifications may be made to the elements illustrated in the drawings, and the embodiment methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole.

In addition, numerous specific details are set forth to provide a thorough understanding of the embodiment embodiments described herein. It will, however, be understood by those of ordinary skill in the art that the embodiment embodiments described herein may be practiced without these specific details. Furthermore, well-known methods, procedures, and elements have not been described in detail so as not to obscure the embodiment embodiments described herein. The subject matter described herein and in the recited claims intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute embodiments of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above embodiments are embodiment only, and thus are not intended to limit in any way the definition and/or meaning of the terms "processor" or "database".

The present disclosure may be embodied in other specific forms without departing from the subject matter of the claims. The described embodiment embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the embodiments, but should be given the broadest interpretation consistent with the description as a whole.

The invention claimed is:

1. A non-transitory machine readable medium having tangibly stored thereon executable instructions for execution by a processor of a computing device, wherein the executable instructions, in response to execution by the processor, cause the computing device to:
   convert voice data to text using speech-to-text synthesis;
   determine a voice command from the text;
   determine whether the voice command is associated with sensitive data based on a set of criteria comprising any one or a combination of a user associated with the voice data, the voice command, requested data or other resources, and a location of user equipment providing a voice user interface (VUI) endpoint;
   route the voice command to an enterprise voice assistant server in response to a determination that the voice command is sensitive; and
   route the voice command to a third party voice assistant server in response to a determination that the voice command is not sensitive.

2. The non-transitory machine readable medium of claim 1, wherein determining the voice command from the text comprises determining a keyword and parameters associated with the keyword upon which the keyword operates, wherein determining whether the voice command is associated with sensitive data based on the set of criteria comprises determining whether the keyword and parameters associated with the keyword upon which the keyword operates is associated with sensitive data based on the set of criteria.

3. The non-transitory machine readable medium of claim 1, wherein the executable instructions, in response to execution by the processor, cause the computing device to:
   determine whether a user associated with the voice data is authorized to perform the voice command;
   reject the voice command in response to a determination that the user is not authorized to perform the voice command;
   wherein routing the voice command to an enterprise voice assistant server in response to a determination that the voice command is sensitive and routing the voice command to a third party voice assistant server in response to a determination that the voice command is not sensitive are only performing in response to a determination that the user is authorized to perform the voice command.

4. The non-transitory machine readable medium of claim 3, wherein the user associated is determined to be unauthorized to perform the voice command in response to a determination that one of the following conditions is met:
   the user is not authorized to perform the voice command; or
   the user is not authorized to access enterprise data required by the voice command.

5. The non-transitory machine readable medium of claim 3, wherein the executable instructions, in response to execution by the processor, cause the computing device to:
   generate a notification that the voice command was rejected in response to a determination that the user is not authorized to perform the voice command.

6. The non-transitory machine readable medium of claim 5, wherein the notification indicates a message that the voice command was rejected in response to a determination that the user is not authorized to perform the voice command.

7. The non-transitory machine readable medium of claim 1, wherein the executable instructions to route the voice command, in response to execution by the processor, cause the computing device to:
   send the voice data to the determined voice assistant server.

8. The non-transitory machine readable medium of claim 1, wherein the executable instructions to route the voice command, in response to execution by the processor, cause the computing device to:
   send a transcript comprising the converted text and/or the determined keyword and parameters to the determined voice assistant server.

9. The non-transitory machine readable medium of claim 1, wherein the executable instructions to route the voice command, in response to execution by the processor, cause the computing device to:
   send context information representative of a context of a user equipment upon which the voice data was received at a time that the voice data was received to the determined voice assistant server along with any one or a combination of the voice data, a transcript comprising the converted text and/or the determined keyword and parameters.

10. The non-transitory machine readable medium of claim 1, wherein the set of criteria comprises a set of security rules.

11. The non-transitory machine readable medium of claim 10, wherein the set of security rules are based on a set of IT policies.

12. The non-transitory machine readable medium of claim 10, wherein the set of security rules determine whether and how to route the voice command.

13. The non-transitory machine readable medium of claim 1, wherein the voice command is determined to be associated with sensitive data in response to a determination that one of the following conditions is met:
the voice command is an enterprise voice command; or
the voice command requires access to enterprise data.

14. The non-transitory machine readable medium of claim 1, wherein the voice command is determined to be associated with sensitive data in response to a determination that one of the following conditions is met:
the voice command is an enterprise voice command;
the voice command requires access to enterprise data; or
the location of user equipment providing the VUI endpoint is an enterprise location.

15. A voice assistant proxy, comprising:
a processor configured to:
convert voice data to text using speech-to-text synthesis;
determine a voice command from the text;
determine whether the voice command is associated with sensitive data based a set of criteria comprising any one or a combination of a user associated with the voice data, the voice command, requested data or other resources, and a location of user equipment providing a voice user interface (VUI) endpoint;
route the voice command to an enterprise voice assistant server in response to a determination that the voice command is sensitive; and
route the voice command to a third party voice assistant server in response to a determination that the voice command is not sensitive.

16. The voice assistant proxy of claim 15, wherein the processor is further configured to:
determine whether a user associated with the voice data is authorized to perform the voice command;
reject the voice command in response to a determination that the user is not authorized to perform the voice command;
wherein routing the voice command to an enterprise voice assistant server in response to a determination that the voice command is sensitive and routing the voice command to a third party voice assistant server in response to a determination that the voice command is not sensitive are only performing in response to a determination that the user is authorized to perform the voice command.

17. The voice assistant proxy of claim 15, wherein the set of criteria comprises a set of security rules that determine whether and how to route the voice command.

18. A method, comprising:
converting voice data to text using speech-to-text synthesis;
determining a voice command from the text;
determining whether the voice command is associated with sensitive data based on a set of criteria comprising any one or a combination of a user associated with the voice data, the voice command, requested data or other resources, and a location of user equipment providing a voice user interface (VUI) endpoint;
routing the voice command to an enterprise voice assistant server in response to a determination that the voice command is sensitive; and
routing the voice command to a third party voice assistant server in response to a determination that the voice command is not sensitive.

19. The method of claim 18, further comprising:
determining whether a user associated with the voice data is authorized to perform the voice command;
rejecting the voice command in response to a determination that the user is not authorized to perform the voice command;
wherein routing the voice command to an enterprise voice assistant server in response to a determination that the voice command is sensitive and routing the voice command to a third party voice assistant server in response to a determination that the voice command is not sensitive are only performing in response to a determination that the user is authorized to perform the voice command.

20. The method of claim 18, wherein the set of criteria comprises a set of security rules that determine whether and how to route the voice command.

* * * * *